United States Patent
Cui et al.

(10) Patent No.: US 11,656,739 B2
(45) Date of Patent: May 23, 2023

(54) METHOD FOR CONTROLLING DISPLAY POSITION OF LIST ITEMS WITHIN A VIEWPORT, ELECTRONIC DEVICE, AND STORAGE MEDIUM

(71) Applicant: BEIJING XIAOMI MOBILE SOFTWARE CO., LTD., Beijing (CN)

(72) Inventors: Baoqiu Cui, Beijing (CN); Hua Wu, Beijing (CN); Ruiduan Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/382,113

(22) Filed: Jul. 21, 2021

(65) Prior Publication Data

US 2022/0221960 A1  Jul. 14, 2022

(30) Foreign Application Priority Data

Jan. 8, 2021  (CN) .......................... 202110021005.2

(51) Int. Cl.
*G06F 3/0482* (2013.01)
*G06F 9/451* (2018.01)
*G06T 3/40* (2006.01)

(52) U.S. Cl.
CPC ............ *G06F 3/0482* (2013.01); *G06F 9/451* (2018.02); *G06T 3/40* (2013.01)

(58) Field of Classification Search
CPC .......... G06F 3/0482; G06F 9/451; G06T 3/40
See application file for complete search history.

(56) References Cited

U.S. PATENT DOCUMENTS

| | | | |
|---|---|---|---|
| 2003/0179207 A1* | 9/2003 | Broussard | G09G 5/14 345/531 |
| 2010/0325533 A1* | 12/2010 | Artz | G06F 16/9577 715/255 |
| 2013/0067393 A1* | 3/2013 | Demopoulos | G06F 3/0488 715/784 |
| 2016/0070429 A1 | 3/2016 | Clark | |

OTHER PUBLICATIONS

European Patent Application No. 21186610.8 extended Search and Opinion dated Dec. 22, 2021, 10 pages.

* cited by examiner

*Primary Examiner* — Jennifer N Welch
*Assistant Examiner* — K C Chen
(74) *Attorney, Agent, or Firm* — Cozen O'Connor

(57) ABSTRACT

The disclosure relates to a method for controlling an operation list, including: obtaining a remaining space between a target operation item and a bottom of a display region, of a display of a device, when the target operation item is located at a preset position; obtaining a size of a current list viewport of the operation list; extending the size of the current list viewport based on the remaining space to generate an extended current list viewport; laying out the operation list based on the extended current list viewport to obtain a size of a next operation item of the target operation item; and determining a display position of the target operation item based on the size of the next operation item and the remaining space.

6 Claims, 10 Drawing Sheets

METHOD FOR CONTROLLING DISPLAY POSITION OF LIST ITEMS WITHIN A VIEWPORT, ELECTRONIC DEVICE, AND STORAGE MEDIUM

This application is based upon and claims priority to Chinese Patent Application No. 202110021005.2 filed on Jan. 8, 2021, the entire contents of which are incorporated herein by reference.

TECHNICAL FIELD

The disclosure relates to the field of smart device technologies, and particularly to a method for controlling an operation list, an electronic device, and a storage medium.

BACKGROUND

Continuous enhancement of function of smart devices (e.g., smart televisions (TV)) is causing the operation list of the smart device to grow in size to include the operation items. At present, each operation item in the operation list of the smart device may be displayed in a center of the smart device, to improve display comfort of the list.

SUMMARY

According to a first aspect of embodiments of the disclosure, there is provided a method for controlling an operation list, including: obtaining a target operation item; obtaining a remaining space between the target operation item and a bottom of a display region when the target operation item is located at a preset position; obtaining a size of a current list viewport of the operation list; extending the size of the current list viewport based on the remaining space to generate an extended current list viewport; laying out the operation list based on the extended current list viewport to obtain a size of a next operation item of the target operation item; and determining a display position of the target operation item based on the size of the next operation item and the remaining space.

According to a second aspect of embodiments of the disclosure, there is also provided an electronic device, including: a processor; and a memory configured to store instructions executable by the processor. The processor is configured to execute the instructions to implement the method for controlling the operation list as described above.

According to a third aspect of embodiments of the disclosure, there is also provided a non-transitory computer-readable storage medium. When instructions in the storage medium are executed by a processor of an electronic device, the processor is caused to implement the method for controlling the operation list as described above.

It is to be understood that both the foregoing general description and the following detailed description are exemplary and explanatory only and are not restrictive of the disclosure.

BRIEF DESCRIPTION OF THE DRAWINGS

The accompanying drawings herein, which are incorporated in and constitute a part of this specification, illustrate embodiments consistent with the disclosure and, together with the description, serve to explain the principles of the disclosure, and does not constitute an improper limitation to the disclosure.

DETAILED DESCRIPTION

In order to enable those skilled in the art to better understand the technical solution in the disclosure, the technical solution in embodiments of the disclosure will be described clearly and completely with reference to the accompanying drawings.

It should be noted that terms "first", "second" and the like in the specification and claims of the disclosure and the above drawings are used to distinguish similar objects, and not necessarily used to describe a specific sequence or an order of priority. It is understandable that the data used in this way may be interchanged under appropriate circumstances, so that the embodiments of the disclosure described herein may be implemented in an order other than those illustrated or described herein. The implementation described in the following exemplary embodiments do not represent all implementations consistent with the disclosure. On the contrary, they are only examples of apparatus and methods consistent with some aspects of the disclosure as detailed in the appended claims.

In the related art, there are no further operation item following a current operation item, blank content may be displayed to the user, resulting in poor user impression. In detail, a currently operable operation item in the operation list may be usually displayed in the center.

Figure 1:
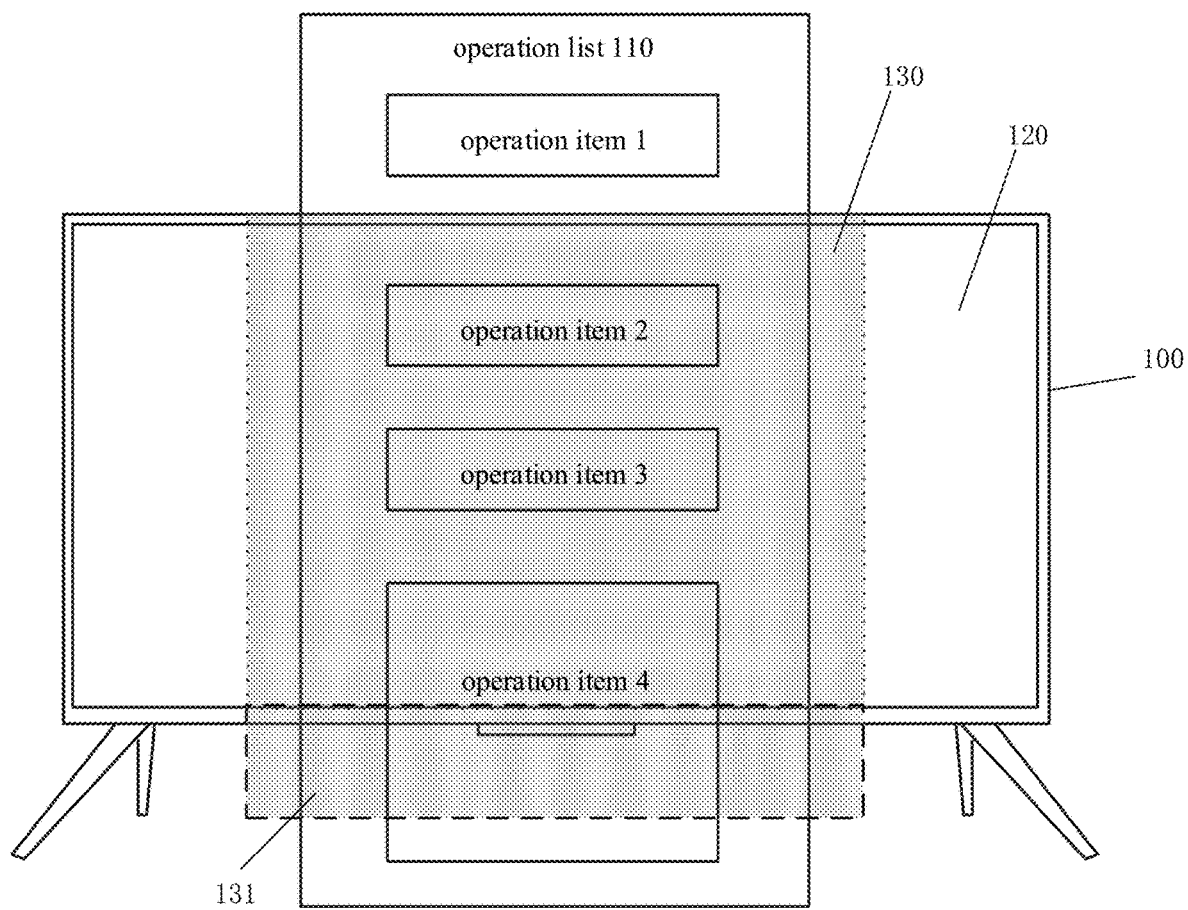
FIG. 1 is a schematic diagram illustrating a display of an operation list of a smart device in the related art.

However, a size of a subsequent operation item is unknown. Although the current operation item is displayed in the center, there will be a gap from a bottom of the display region when the subsequent operation item is too large to be rendered, or the remaining space may not be filled when the second operation item below is not rendered if the next operation item is too small. FIG. 1 shows a prior art schematic diagram illustrating a display of an operation list of a smart device in the related arts. The smart TV is taken as an example for description, but other smart devices are included in the scope hereof (such as tablets, phones, computers, etc.). The smart TV 100 has an operation list 110 and a display region 120. The operation list 110 has a current list viewport 130, in which the current list viewport 130 has a buffer 131. The operation list 110 includes operation items from the operation item 1 to the operation item 4. Currently, the operation items 2 and 3 are displayed in the current list viewport 130, and the operation item 3 is displayed in the center. It may be seen from the drawing that the size of the operation item 4 is large, so the operation item 4 is not completely moved into the buffer 131. As a result, the operation item 4 is not rendered. Therefore, the operation item 4 may not be displayed, resulting in a lot of white space between the operation item 3 and the bottom of the display region in the display region 120.

In summary, it may be seen that the method for controlling the operation list in the related art may cause a gap from the bottom of the display region, resulting in poor display effect, and a white space in the display region of the smart device, seriously affecting user impression.

In some embodiments of the disclosure, in order to obtain a size of a next operation item, it is necessary to extend a buffer of a list viewport, that is, the buffer region is increased, and an extending length is dynamically configured, so that the specific information of the next operation item may be seen, and accurate loading may be achieved when loading.

Figure 2:
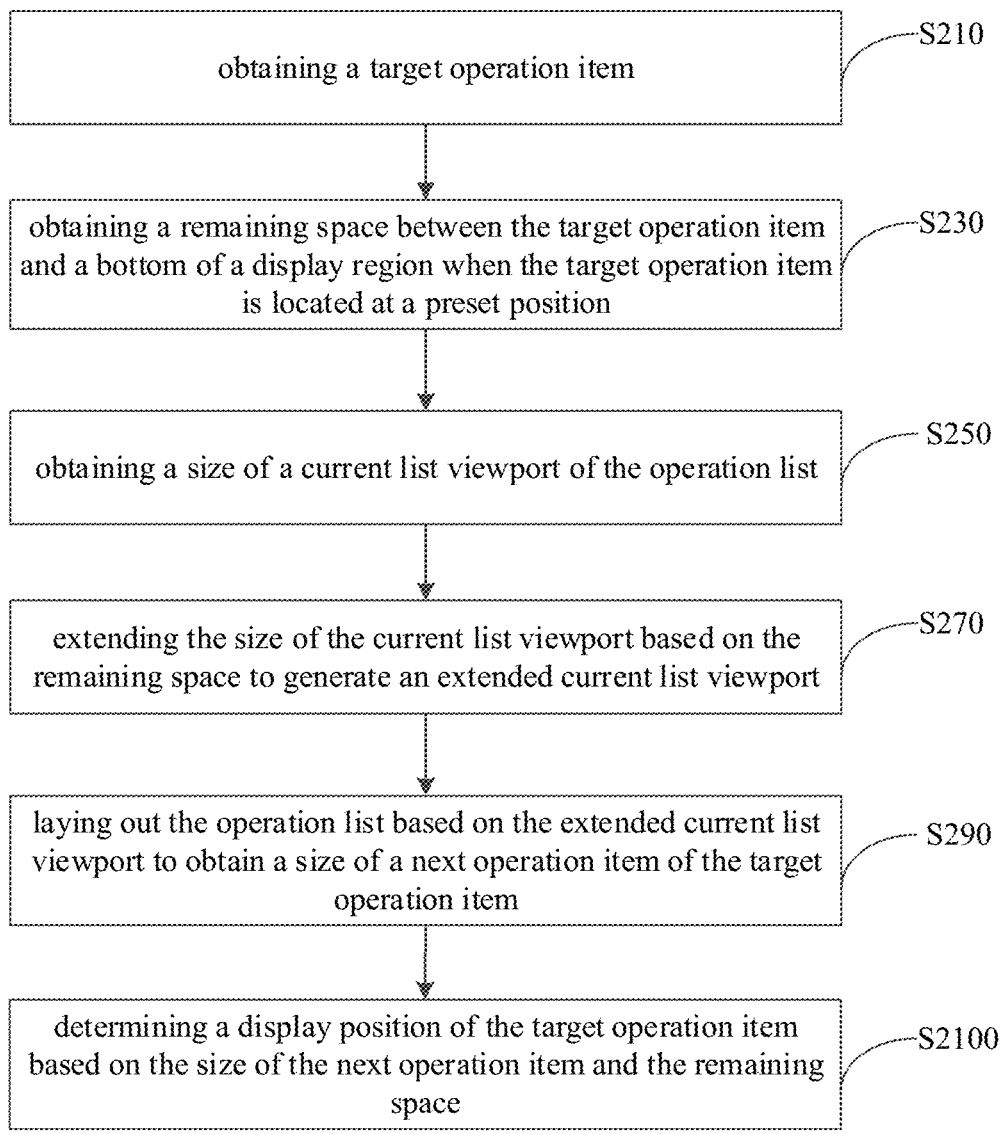
FIG. 2 is a flow chart illustrating a method for controlling an operation list according to exemplary embodiments.

FIG. 2 depicts a flow chart illustrating a method for controlling an operation list according to embodiments. The method includes the following.

In block S210, a target operation item is obtained.

According to some embodiments of the disclosure, the method for controlling the operation list may be configured not only in smart devices, but also in other devices similar to smart devices.

Figure 3A:
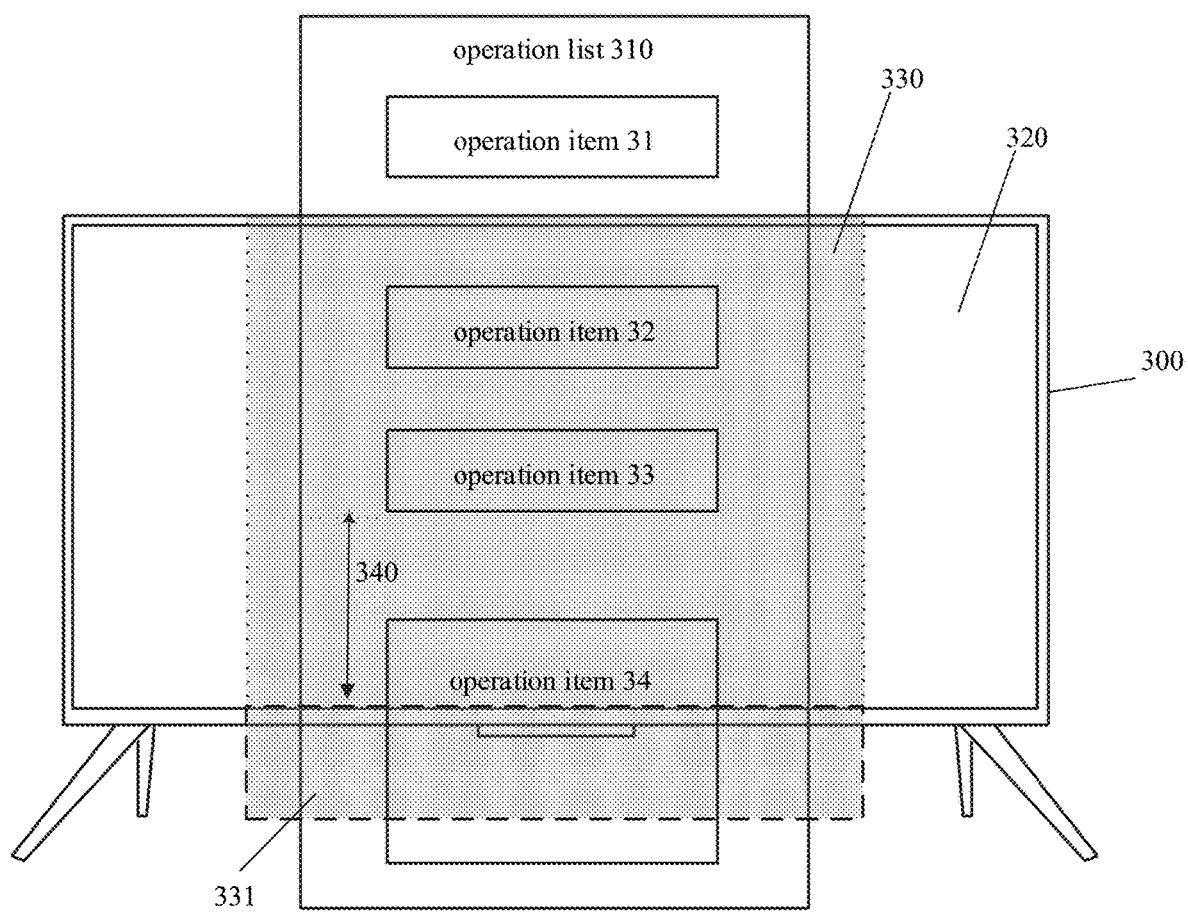
FIGS. 3a-3e are schematic diagrams illustrating a control of an operation list according to exemplary embodiments.

FIG. 3a depicts a schematic diagram illustrating a control of an operation list according to exemplary embodiments. A smart TV is taken as an example for description. The smart TV 300 has an operation list 310 and a display region 320. The operation list 310 has a current list viewport 330, in which the list viewport 330 has a buffer 331. The operation list 310 includes operation items from the operation item 31 to the operation item 34. Currently, the operation items 32 and 33 are displayed in the current list viewport 330. It may be seen from the drawing that the size of the operation item 34 is large, so the operation item 34 is not completely moved into the buffer 331. As a result, the operation item 34 is not rendered. In some embodiments, the obtained target operation item refers to the target operation item entering the current list viewport 330, such as the operation items 32 and 33. According to some embodiments of the disclosure, the target operation item refers to the last operation item entered into the current list, for example, the operation item 33. In some embodiments, the operation item 33 is the target operation item. For the target operation item, it is preferentially set at a preset position, for example, a center position of the display region 320. It may be seen from the drawing that the operation list 310 is relatively long, and the operation list 310 includes a plurality of operation items. Since the operation list 310 is relatively long, it may not be completely displayed for the smart TV 300. Therefore, the list viewport 330 is used to display the visible region of the operation list 310, in which the list viewport 330 is the part that may be displayed by the smart TV 300. Generally speaking, a size of the list viewport 330 is close to a size of the display region 320 of the smart TV 300. In order to improve the response speed, a buffer 331 may be added to the list viewport 330. When an operation item enters the buffer 331, the operation item may be laid out and rendered in advance. On the contrary, when the operation item does not enter the buffer 331, or when only part of the operation item enters the buffer 331, the operation item may not be laid out and rendered, nor may the size of the operation item be known. As illustrated in FIG. 3a, because the operation item 4 has not completely entered the buffer 331, the operation item 4 may not be laid out and rendered, and the size of the operation item 4 may not be known.

In block S230, a remaining space between the target operation item and a bottom of a display region is obtained when the target operation item is located at a preset position.

In some embodiments of the disclosure, the preset position may be the center of the display region, that is, the target operation item is displayed in the center. However, it should be noted that displaying the target operation item in the center of the display region is only a method for controlling a display of a smart TV. For smart TVs, the preset position may also be set in other parts based on the layout requirements. Of course, in other smart devices, the preset position may also be preset based on needs of other smart devices. Since the target operation item has entered the list viewport, the target operation item has been laid out and rendered, and the size of the target operation item may be obtained. FIG. 3a shows the target operation item is the operation item 33. When the operation item 33 is in the center position, as illustrated in FIG. 3a, the remaining space refers to the distance between the bottom of the operation item 33 and the bottom of the display region 320. Therefore, as illustrated in FIG. 3a, the remaining space is 340.

In block S250, a size of a current list viewport of the operation list is obtained.

In some embodiments of the disclosure, because different devices have different display regions, the sizes of the list viewports corresponding to the devices with different display regions are also different. In some embodiments of the disclosure, since the size of the current list viewport is close to the size of the display region of the smart device, different smart devices may correspond to different current list viewports in different preset sizes.

In block S270, the size of the current list viewport is extended based on the remaining space to generate an extended current list viewport.

Figure 3B:
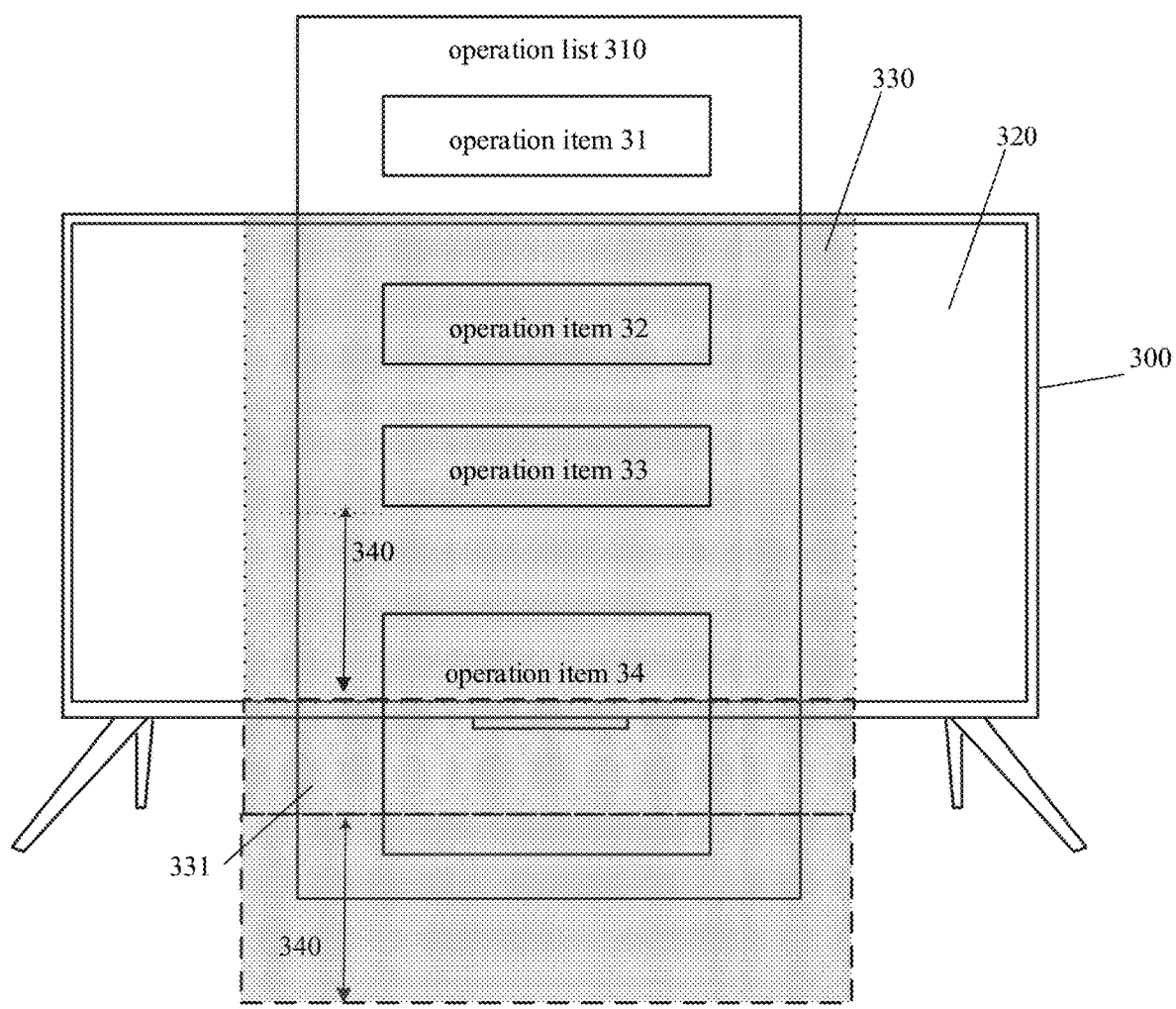

In some embodiments of the disclosure, the current list viewport may be dynamically extended, so that the next operation item may be added to the extended current list viewport, and the next operation item may be laid out and rendered to obtain the size of the next operation item. Referring to FIG. 3b, it is a schematic diagram illustrating a control of an operation list according to exemplary embodiments. In some embodiments, the buffer 331 may be extended by the remaining space 340, so that the buffer 331 of the extended current list viewport 330 may cover the next operation item 34.

In some embodiments of the disclosure, extending the current list viewport 330 refers to extending the buffer 331 of the current list viewport 330, so that the buffer 331 may add the next operation item 34 into it. After the next operation item 34 is moved into the buffer 331, the size of the next operation item 34 may be obtained. At the same time, since the buffer 331 has been extended by the remaining space 340, next operation items that fill the remaining space 340 may all be moved into the buffer 331.

In some embodiments of the disclosure, the current list viewport is extended based on the remaining space corresponding to the current operation item, so the buffer of the current list viewport may be extended by the corresponding remaining space. In this way, the next operation item may be added into the buffer.

In some embodiments of the disclosure, referring to FIG. 3b, when the size of the next operation item 34 is too large and the next operation item 34 may not be moved into the buffer 331 normally, the next operation item 34 may not be laid out and rendered. Therefore, the size of the next operation item 34 may not be known, and the position of the current operation item 33 may not be selected. For this reason, at this time, the buffer 331 of the current list viewport 330 needs to be extended, so that the next operation item 34 may be moved into the buffer 331 so as to determine the size of the next operation item 34.

In block S290, the operation list is laid out based on the extended current list viewport to obtain a size of a next operation item of the target operation item.

In some embodiments of the disclosure, with further reference to FIG. 3b, since the next operation item 34 has been added to the buffer 331 of the current list viewport 330, the next operation item 34 in the buffer 331 is laid out and rendered based on the mechanism of the current list viewport 330, so that the size of the next operation item 34 may be known.

In block S2100, a display position of the target operation item is determined based on the size of the next operation item and the remaining space.

Figure 3C:
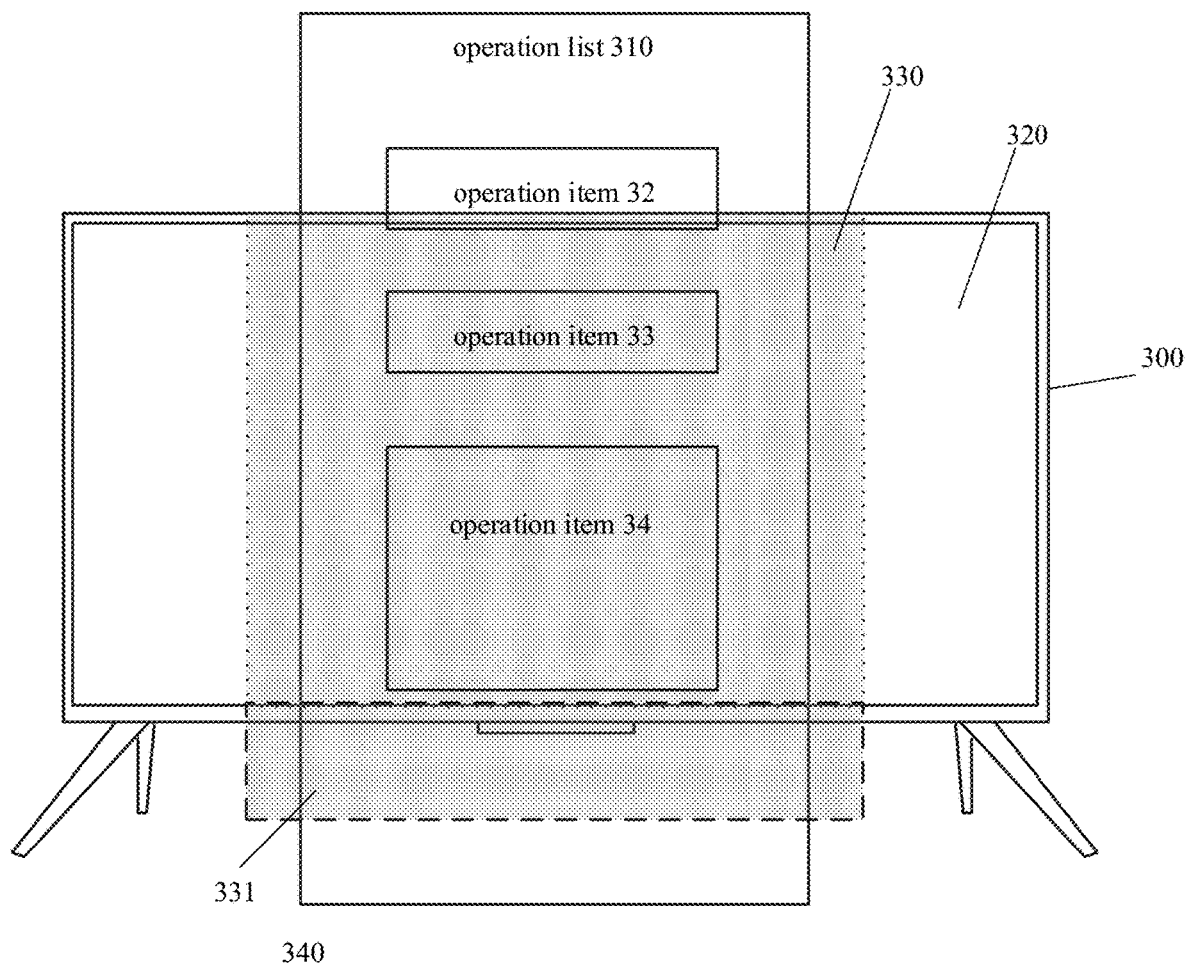
Figure 3D:
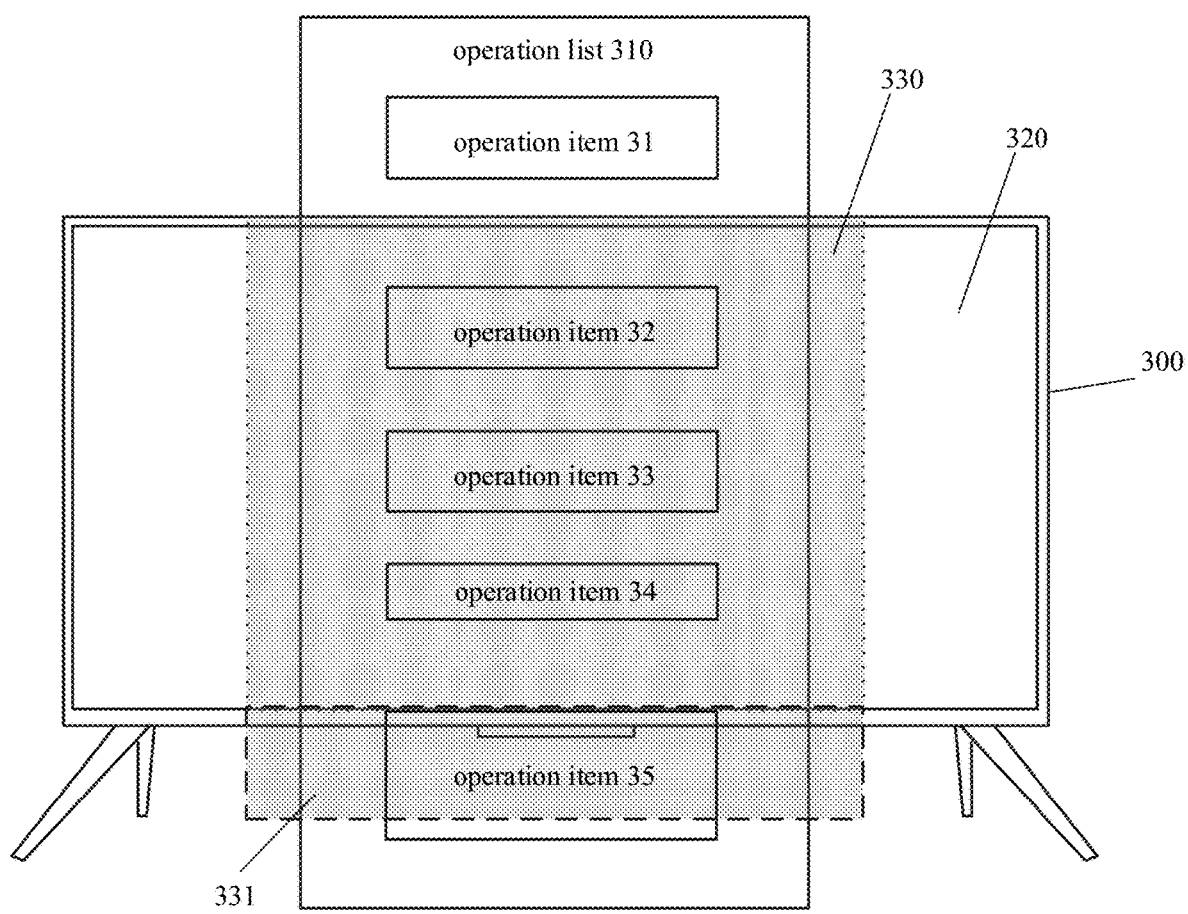

In some embodiments of the disclosure, with further reference to FIG. 3b, after the size of the next operation item 34 is obtained, the display position of the target operation item 33 may be determined based on the size of the next operation item 34 and the remaining space 340. After the size of the next operation item 34 is known, the next operation item 34 may be rendered and laid out so as to obtain the size of the next operation item 34. After the size of the next operation item 34 and the size of the target operation item 33 are obtained, the appropriate position of the target operation item 33 may be dynamically determined. For example, when the next operation item 34 may fill the remaining space 340, the target operation item may be displayed in the center; when the next operation item 34 is slightly larger than the remaining space 340, the target operation item 33 may also be slightly deviated upward from the center position, so that the next operation item 34 may be displayed in the remaining space 340, as illustrated in FIG. 3c. Or, when the next operation item 34 is relatively large, since the next operation item 34 has been rendered, a part of the next operation item 34 may be displayed in the remaining space 340, and the target operation item 33 may be displayed in the center, as illustrated in FIG. 3d.

According to some embodiments of the disclosure, when the size of the next operation item is greater than or equal to the size of the remaining space, it means that the next operation item may fill the remaining space, so the target operation item may be set at the center position, and the remaining space may be filled with part or all of the next operation item.

Figure 3E:
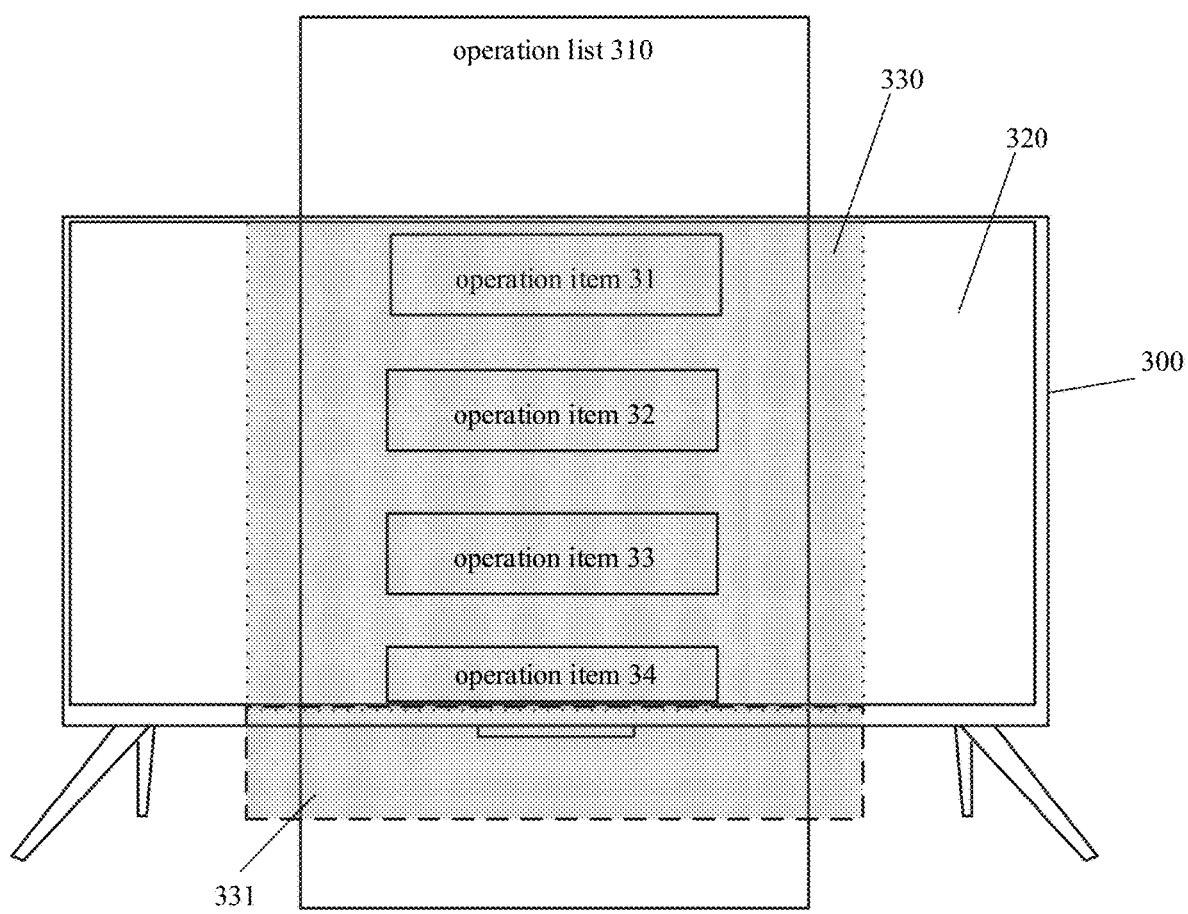

In some embodiments embodiment of the disclosure, when the size of the next operation item is smaller than the size of the remaining space, the difference between the size of the next operation item and the size of the remaining space is obtained, and the target operation item is deviated downward from the center position by the difference based on the difference. FIG. 3d depicts a schematic diagram illustrating a control of an operation list according to embodiments. In some embodiments, the size of the next operation item 34 is small and may not fill the remaining space. Therefore, both the current operation item 33 and the next operation item 34 need to deviate downward the difference shown, so that the next operation item 34 may fill the remaining space, as illustrated in FIG. 3e.

In some embodiments, when the size of the next operation item is too small to fill the remaining space, the difference between the size of the next operation item and the size of the remaining space is calculated, and the target operation item is deviated downward by the difference from the center position based on the difference, so that the next operation item may just fill the remaining space, thereby avoiding white space.

According to some embodiments of the disclosure, after the position of the current operation item is determined, the size of the current list viewport is restored to the default size. Referring to FIG. 3d, after the position of the current operation item 33 is determined, the size of the current list viewport 330 is restored, that is, the extended part of the buffer 331 (as illustrated in FIG. 3b) is restored to the initial state.

Figure 4:
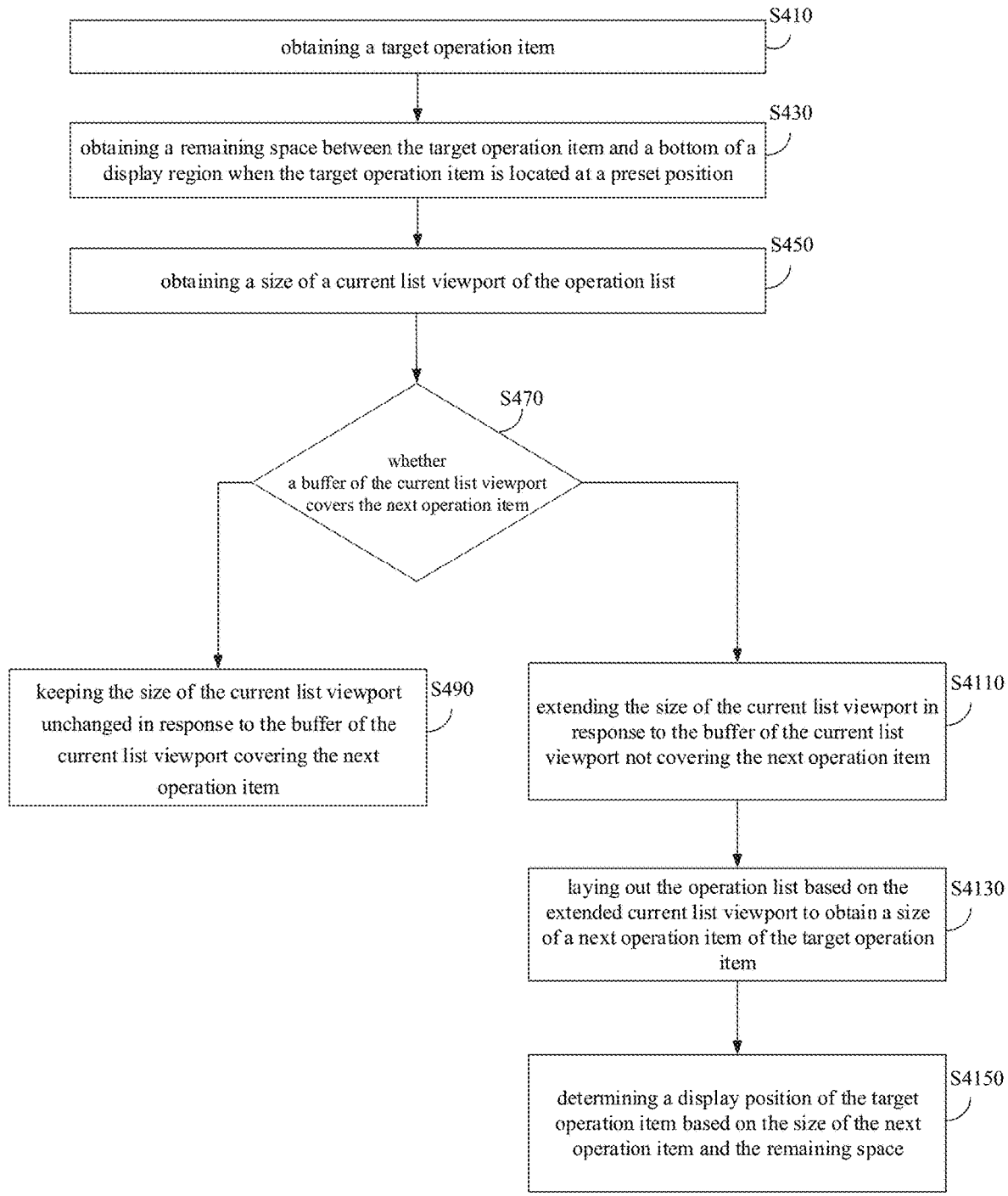
FIG. 4 is a flow chart illustrating a method for controlling an operation list according to exemplary embodiments.

FIG. 4 shows a flow chart illustrating a method for controlling an operation list according to embodiments. The method includes the following.

In block S410, a target operation item is obtained.

According to some embodiments of the disclosure, the method for controlling the operation list may be configured not only in smart devices, but also in other devices similar to smart devices.

As illustrated in FIG. 3a, it is a schematic diagram illustrating a control of an operation list according to exemplary embodiments. A smart TV is taken as an example for description. The smart TV 300 has an operation list 310 and a display region 320. The operation list 310 has a current list viewport 330, in which the list viewport 330 has a buffer 331. The operation list 310 includes operation items from the operation item 31 to the operation item 34. Currently, the operation items 32 and 33 are displayed in the current list viewport 330. It may be seen from the drawing that the size of the operation item 34 is large, so the operation item 34 is not completely moved into the buffer 331. As a result, the operation item 34 is not rendered. In some embodiments, the obtained target operation item refers to the target operation item entering the current list viewport 330, such as the operation items 32 and 33. According to some embodiments of the disclosure, the target operation item refers to the last operation item entered into the current list, for example, the operation item 33. In some embodiments, the operation item 33 is the target operation item. For the target operation item, it is preferentially set at a preset position, for example, a center position of the display region 320. It may be seen from the drawing that the operation list 310 is relatively long, and the operation list 310 includes a plurality of operation items. Since the operation list 310 is relatively long, it may not be completely displayed for the smart TV 300. Therefore, the list viewport 330 is used to display the visible region of the operation list 310, in which the list viewport 330 is the part that may be displayed by the smart TV 300. Generally speaking, a size of the list viewport 330 is close to a size of the display region 320 of the smart TV 300. In order to improve the response speed, a buffer 331 may be added to the list viewport 330. When an operation item enters the buffer 331, the operation item may be laid out and rendered in advance. On the contrary, when the operation item does not enter the buffer 331, or when only part of the operation item enters the buffer 331, the operation item may not be laid out and rendered, nor may the size of the operation item be known. As illustrated in FIG. 3a, because the operation item 4 has not completely entered the buffer 331, the operation item 4 may not be laid out and rendered, and the size of the operation item 4 may not be known.

In block S430, a remaining space between the target operation item and a bottom of a display region is obtained when the target operation item is located at a preset position.

In some embodiments of the disclosure, the preset position may be the center of the display region, that is, the target operation item is displayed in the center. However, it should be noted that displaying the target operation item in the center of the display region is only a method for controlling a display of a smart TV. For smart TVs, the preset position may also be set in other parts based on the layout requirements. Of course, in other smart devices, the preset position may also be preset based on needs of other smart devices. Since the target operation item has entered the list viewport, the target operation item has been laid out and rendered, and the size of the target operation item may be obtained. As illustrated in FIG. 3a, the target operation item is the operation item 33. When the operation item 33 is in the center position, as illustrated in FIG. 3a, the remaining space refers to the distance between the bottom of the operation item 33 and the bottom of the display region 320. Therefore, as illustrated in FIG. 3a, the remaining space is 340.

In block S450, a size of a current list viewport of the operation list is obtained.

In some embodiments of the disclosure, because different devices have different display regions, the sizes of the list viewports corresponding to the devices with different display regions are also different. In some embodiments of the disclosure, since the size of the current list viewport is close to the size of the display region of the smart device, different smart devices may correspond to different current list viewports in different preset sizes.

In block S470, it is determined whether a buffer of the current list viewport covers the next operation item.

In some embodiments of the disclosure, the word "cover" means that the next operation item completely enters the buffer. In this block, it is determined whether the next item operation completely enters the buffer.

For the buffer, when the next operation item does not enter the buffer, or only partially enters the buffer, the next operation item may not be rendered. Only when the next operation item completely enters the buffer, the rendering of the next operation item may be triggered.

In block S490, the size of the current list viewport keeps unchanged in response to the buffer of the current list viewport covering the next operation item.

In block S4110, the size of the current list viewport is extended in response to the buffer of the current list viewport not covering the next operation item.

In some embodiments, when the buffer may not cover the next operation item, the buffer may be dynamically extended. In some embodiments, when the buffer may not cover the next operation item, the next operation item may not be laid out and rendered, so the size of the next operation item may not be known.

According to some embodiments of the disclosure, the size of the current list viewport is extended based on the remaining space to generate an extended current list viewport.

In some embodiments of the disclosure, the current list viewport may be dynamically extended, so that the next operation item may be added to the extended current list viewport, and the next operation item may be laid out and rendered to obtain the size of the next operation item. Referring to FIG. 3b, it is a schematic diagram illustrating a control of an operation list according to exemplary embodiments. In some embodiments, the buffer 331 may be extended by the remaining space 340, so that the buffer 331 of the extended current list viewport 330 may cover the next operation item 34.

In some embodiments of the disclosure, extending the current list viewport 330 refers to extending the buffer 331 of the current list viewport 330, so that the buffer 331 may add the next operation item 34 into it. After the next operation item 34 is moved into the buffer 331, the size of the next operation item 34 may be obtained. At the same time, since the buffer 331 has been extended by the remaining space 340, next operation items that fill the remaining space 340 may all be moved into the buffer 331.

In some embodiments of the disclosure, the current list viewport is extended based on the remaining space corresponding to the current operation item, so the buffer of the current list viewport may be extended by the corresponding remaining space. In this way, the next operation item may be added into the buffer.

In some embodiments of the disclosure, referring to FIG. 3b, when the size of the next operation item 34 is too large and the next operation item 34 may not be moved into the buffer 331 normally, the next operation item 34 may not be laid out and rendered. Therefore, the size of the next operation item 34 may not be known, and the position of the current operation item 33 may not be selected. For this reason, at this time, the buffer 331 of the current list viewport 330 needs to be extended, so that the next operation item 34 may be moved into the buffer 331 so as to determine the size of the next operation item 34.

In block S4130, the operation list is laid out based on the extended current list viewport to obtain a size of a next operation item of the target operation item.

In some embodiments of the disclosure, with further reference to FIG. 3b, since the next operation item 34 has been added to the buffer 331 of the current list viewport 330, the next operation item 34 in the buffer 331 is laid out and rendered based on the mechanism of the current list viewport 330, so that the size of the next operation item 34 may be known.

In block S4150, a display position of the target operation item is determined based on the size of the next operation item and the remaining space.

In some embodiments of the disclosure, with further reference to FIG. 3b, after the size of the next operation item 34 is obtained, the display position of the target operation item 33 may be determined based on the size of the next operation item 34 and the remaining space 340. After the size of the next operation item 34 is known, the next operation item 34 may be rendered and laid out so as to obtain the size of the next operation item 34. After the size of the next operation item 34 and the size of the target operation item 33 are obtained, the appropriate position of the target operation item 33 may be dynamically determined. For example, when the next operation item 34 may fill the remaining space 340, the target operation item may be displayed in the center; when the next operation item 34 is slightly larger than the remaining space 340, the target operation item 33 may also be slightly deviated upward from the center position, so that the next operation item 34 may be displayed in the remaining space 340, as illustrated in FIG. 3c. Or, when the next operation item 34 is relatively large, since the next operation item 34 has been rendered, a part of the next operation item 34 may be displayed in the remaining space 340, and the target operation item 33 may be displayed in the center, as illustrated in FIG. 3d.

According to some embodiments of the disclosure, when the size of the next operation item is greater than or equal to the size of the remaining space, it means that the next operation item may fill the remaining space, so the target operation item may be set at the center position, and the remaining space may be filled with part or all of the next operation item.

In some embodiments embodiment of the disclosure, when the size of the next operation item is smaller than the size of the remaining space, the difference between the size of the next operation item and the size of the remaining space is obtained, and the target operation item is deviated downward from the center position by the difference based on the difference. As illustrated in FIG. 3d, it is a schematic diagram illustrating a control of an operation list according to exemplary embodiments. In some embodiments, the size of the next operation item 34 is small and may not fill the remaining space. Therefore, both the current operation item 33 and the next operation item 34 need to deviate downward the difference shown, so that the next operation item 34 may fill the remaining space, as illustrated in FIG. 3e.

In some embodiments, when the size of the next operation item is too small to fill the remaining space, the difference between the size of the next operation item and the size of the remaining space is calculated, and the target operation item is deviated downward by the difference from the center position based on the difference, so that the next operation item may just fill the remaining space, thereby avoiding white space.

According to some embodiments of the disclosure, after the position of the current operation item is determined, the size of the current list viewport is restored to the default size. Referring to FIG. 3d, after the position of the current operation item 33 is determined, the size of the current list viewport 330 is restored, that is, the extended part of the buffer 331 (as illustrated in FIG. 3b) is restored to the initial state.

Figure 5:
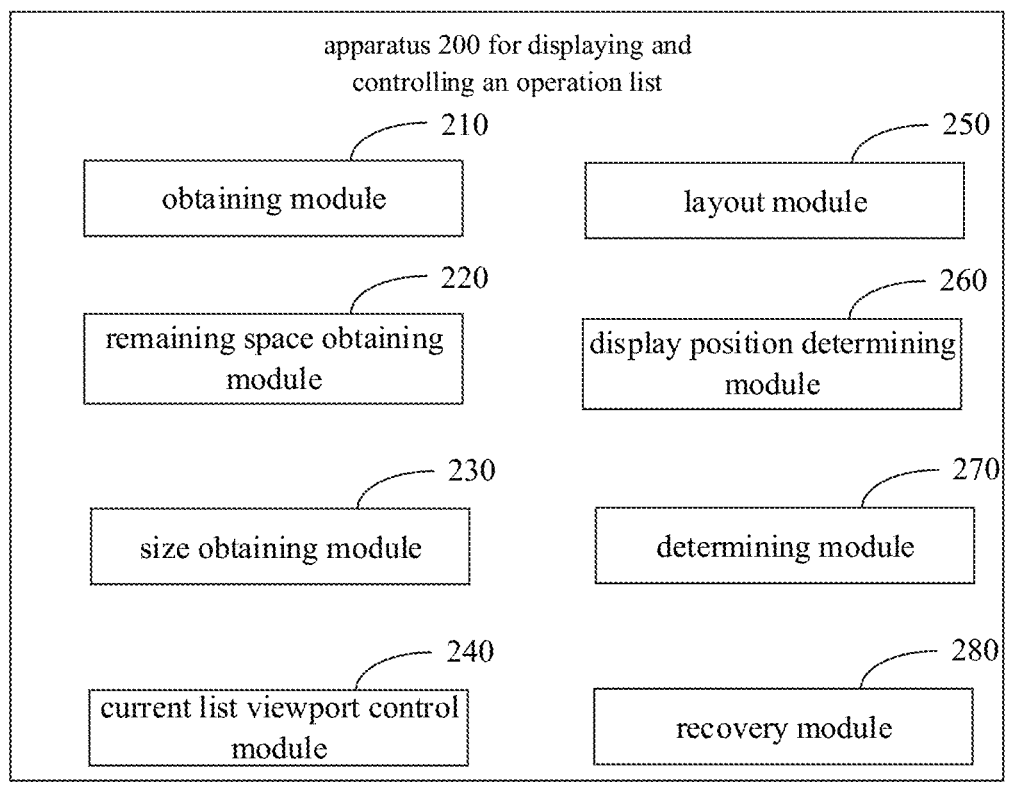
FIG. 5 is a block diagram illustrating an apparatus for controlling an operation list according to exemplary embodiments.

FIG. 5 depicts a block diagram illustrating an apparatus for controlling an operation list according to exemplary embodiments. The apparatus 200 includes an obtaining module 210, a remaining space obtaining module 220, a size obtaining module 230, a current list viewport control module 240, a layout module 250, and a display position determining module 260. The obtaining module 210 is configured to obtain a target operation item. The remaining space obtaining module 220 is configured to obtain a remaining space between the target operation item and a bottom of a display region when the target operation item is located at a preset position. The size obtaining module 230 is configured to obtain a size of a current list viewport of the operation list. The current list viewport control module 240 is configured to extend a size of the current list viewport based on the remaining space to generate an extended current list viewport. The layout module 250 is configured to lay out the operation list based on the extended current list viewport to obtain a size of a next operation item of the target operation item. The display position determining module 260 is configured to determine a display position of the target operation item based on the size of the next operation item and the remaining space.

According to some embodiments of the disclosure, the display position determining module 260 is configured to set the target operation item as the preset position in response to the size of the next operation item being greater than or equal to a size of the remaining space.

According to some embodiments of the disclosure, the display position determining module 260 is configured to obtain a difference between the size of the next operation item and a size of the remaining space in response to the size of the next operation item being smaller than the size of the remaining space, and deviate, based on the difference, the target operation item from the preset position by the difference.

According to some embodiments of the disclosure, the apparatus 200 further includes a determining module 270, configured to determine whether a buffer of the current list viewport covers the next operation item. The current list viewport control module 240 is further configured to keep the size of the current list viewport unchanged in response to the buffer of the current list viewport covering the next operation item, and extend the size of the current list viewport in response to the buffer of the current list viewport not covering the next operation item.

According to some embodiments of the disclosure, the apparatus 200 further includes a recovery module 280. The recovery module 280 is configured to restore the size of the current list viewport to a default size.

Regarding to the apparatus in the above embodiments, the specific operation methods in which each module performs has been described in detail in the embodiments of the method, and will not be elaborated herein.

According to a third aspect of embodiments of the disclosure, there is also provided an electronic device, including: a processor; and a memory configured to store instructions executable by the processor, in which the processor is configured to execute the instructions to implement the method for controlling the operation list as described above.

In order to implement the above embodiments, there is also provided a storage medium.

When instructions in the storage medium are executed by the processor of an electronic device, the electronic device may execute the above method.

In order to implement the above embodiments, there is also provided a computer program product.

When the computer program product is executed by a processor of an electronic device, the electronic device may execute the above method.

Figure 6:
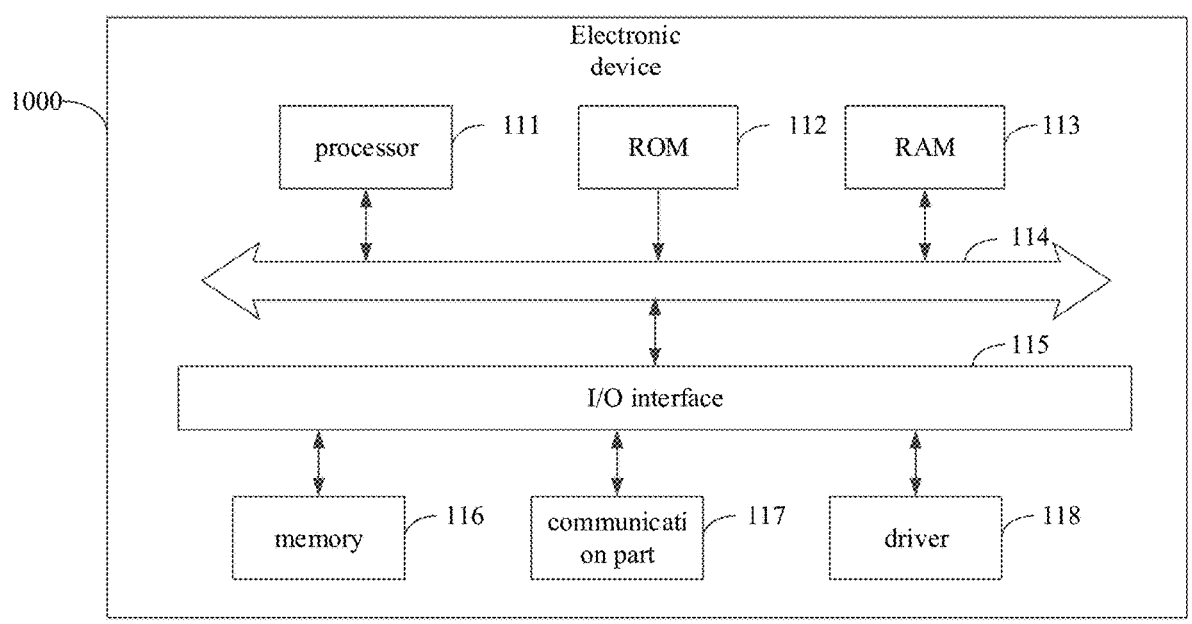
FIG. 6 is a block diagram illustrating an electronic device according to exemplary embodiments.

FIG. 6 is a block diagram illustrating an electronic device according to embodiments. The electronic device illustrated in FIG. 6 is only an example, and is not restrictive of functions and the usable range of embodiments of the disclosure.

As illustrated in FIG. 6, the electronic device 1000 includes a processor 111, which may execute various appropriate actions and processing based on the program stored in a read only memory (ROM) 112 or the program loaded in a random access memory (RAM) 113 from the memory 116. In the RAM 113, various programs and data required for the operations of the electronic device 1000 are also stored. The processor 111, the ROM 112, and the RAM 113 are connected to one another through a bus 114. The input/output (I/O) interface 115 is also connected to the bus 114.

The following components are connected to the I/O interface 115: a memory 116 including a hard disk, and the like; and a communication part 117 including a network interface card, such as a LAN (Local Area Network) card, a modem, and the like, which is executed by a network communication processing such as the Internet; and the driver 118 is also connected to the I/O interface 115 as needed.

In particular, based on embodiments of the disclosure, the processes described above with reference to the flow charts may be implemented as computer software programs. For example, the embodiments of the disclosure include a computer program carried on a computer-readable medium, in which the computer program includes program codes for executing the method illustrated in the flow chart. In such some embodiments, the computer program may be downloaded and installed from the network through the communication part 117. When the computer program is executed by the processor 111, the processor 111 executes the above functions defined in the method of the disclosure.

In some exemplary embodiments, there is also provided a storage medium including instructions, such as the memory including instructions. The instructions may be executable by the processor 111 in the electronic device 1000, for performing the above methods. Optionally, the storage medium may be a non-transitory computer-readable storage medium, for example, the non-transitory computer-readable storage medium may be a ROM, a RAM, a CD-ROM, a magnetic tape, a floppy disc, an optical data storage device, and the like.

In the disclosure, a computer-readable storage medium may be any tangible medium that includes or stores programs, in which the programs may be used by or in combination with instruction execution systems, apparatus, or devices. In the disclosure, a computer-readable signal medium may include data signals spread in a baseband or as a part of a carrier wave, in which a computer-readable program code is carried. The spreading data signals may take many forms, including but not limited to electromagnetic signals, optical signals, or any appropriate combination of the above. The computer-readable signal medium may also be any computer-readable medium other than the computer-readable storage medium. The computer-readable medium may transmit, spread, or transmit programs for use by or in combination with the instruction execution systems, apparatus, or devices. The program code included in the computer-readable medium may be transmitted by any suitable medium, including but not limited to: wireless, wire, optical cable, RF, and the like, or any suitable combination of the above.

The technical solutions provided in embodiments of the disclosure may at least have the following beneficial effects. In the embodiments of the disclosure, the current list viewport may be extended based on the remaining space, so as to lay out based on the extended current list viewport, to determine the size of the next operation item, and to determine the display position of the target operation item based on the size of the next operation item and the remaining space. Therefore, white space at the bottom of the screen may be avoided, and the user impression may be improved.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that the disclosure is not limited to the precise structure described above and illustrated in the drawings, and various modifications and changes may be made without departing from its scope. The scope of the disclosure is only limited by the appended claims.

What is claimed is:

1. A method for controlling an operation list on a device, comprising:
   obtaining a target operation item, wherein the target operation item refers to items entering a current list viewport of the operation list;
   obtaining a remaining space between the target operation item and a bottom of a display region of a display of the device when the target operation item is located at a preset position of the display region;
   extending a buffer of the current list viewport of the operation list based on the remaining space;
   laying out the operation list based on the extended buffer and the current list viewport to obtain a size of a next operation item of the target operation item after the next operation item is moved into the buffer;
   determining a display position of the target operation item within the display region based on the size of the next operation item and the remaining space, comprising:
      setting the target operation item at the preset position in response to the size of the next operation item being greater than or equal to a size of the remaining space, and filling part or all of the next operation item in the remaining space; and
      obtaining a difference between the size of the next operation item and a size of the remaining space in response to the size of the next operation item being smaller than the size of the remaining space, and deviating, based on the difference, the target operation item from the preset position by the difference, so that the next operation item fills the remaining space; and
   restoring the buffer of the current list viewport to a default size.

2. The method as claimed in claim 1, further comprising:
   determining whether the buffer of the current list viewport covers the next operation item;
   keeping the buffer of the current list viewport unchanged in response to the buffer of the current list viewport covering the next operation item; and
   extending the buffer of the current list viewport in response to the buffer of the current list viewport not covering the next operation item.

3. An electrical device, comprising:
   a processor; and
   a memory configured to store instructions executable by the processor;
   wherein the processor is configured to execute the instructions to:
      obtain a target operation item, wherein the target operation item refers to items entering a current list viewport of an operation list;
      obtain a remaining space between the target operation item and a bottom of a display region when the target operation item is located at a preset position of the display region;
      extend a buffer of the current list viewport of the operation list based on the remaining space;
      lay out the operation list based on the extended buffer and the current list viewport to obtain a size of a next operation item of the target operation item after the next operation item is moved into the buffer; and
      determine a display position of the target operation item within the display region based on the size of the next operation item and the remaining space;
      restore the buffer of the current list viewport to a default size;
   wherein the processor is further configured to execute the instructions to: set the target operation item at the preset position in response to the size of the next operation item being greater than or equal to a size of the remaining space, and fill part or all of the next operation item in the remaining space; and
      obtain a difference between the size of the next operation item and a size of the remaining space in response to the size of the next operation item being smaller than the size of the remaining space; and deviate, based on the difference, the target operation item from the preset position by the difference, so that the next operation item fills the remaining space.

4. The device as claimed in claim 3, wherein the processor is further configured to execute the instructions to:
   determine whether the buffer of the current list viewport covers the next operation item;
   keep the buffer of the current list viewport unchanged in response to the buffer of the current list viewport covering the next operation item; and extend the buffer of the current list viewport in response to the buffer of the current list viewport not covering the next operation item.

5. A non-transitory computer-readable storage medium, wherein when instructions in the storage medium are executed by a processor of an electronic device, the processor is caused to implement a method for controlling an operation list, the method comprising:

obtaining a target operation item, wherein the target operation item refers to items entering a current list viewport of an operation list;

obtaining a remaining space between the target operation item and a bottom of a display region when the target operation item is located at a preset position of the display region;

extending a buffer of the current list viewport of the operation list based on the remaining space;

laying out the operation list based on the extended buffer and the current list viewport to obtain a size of a next operation item of the target operation item after the next operation item is moved into the buffer;

determining a display position of the target operation item within the display region based on the size of the next operation item and the remaining space, comprising:

setting the target operation item at the preset position in response to the size of the next operation item being greater than or equal to a size of the remaining space, and filling part or all of the next operation item in the remaining space; and obtaining a difference between the size of the next operation item and a size of the remaining space in response to the size of the next operation item being smaller than the size of the remaining space; and deviating, based on the difference, the target operation item from the preset position by the difference, so that the next operation item fills the remaining space; and restoring the buffer of the current list viewport to a default size.

6. The non-transitory computer-readable storage medium as claimed in claim 5, wherein the method further comprises:

determining whether the buffer of the current list viewport covers the next operation item;

keeping the buffer of the current list viewport unchanged in response to the buffer of the current list viewport covering the next operation item; and extending the buffer of the current list viewport in response to the buffer of the current list viewport not covering the next operation item.

* * * * *